United States Patent [19]

Anderson et al.

[11] Patent Number: 5,535,689
[45] Date of Patent: Jul. 16, 1996

[54] VACUUM PLANTING APPARATUS

[76] Inventors: Larry L. Anderson, Rt. 2, Box 297, Torrington, Wyo. 82240; Thomas K. Tallackson, 1318 Jackson Ave., Detroit Lakes, Minn. 56501; Jeffery I. Peterman, 190027 C.R. J, Scottsbluff, Nebr. 69361

[21] Appl. No.: 291,879

[22] Filed: Aug. 17, 1994

[51] Int. Cl.⁶ .................................................. A01C 7/04
[52] U.S. Cl. .......................... 111/177; 111/185; 221/211
[58] Field of Search ............................ 111/77, 78, 34, 111/177, 178, 185, 200; 47/58, 62, 901; 221/211, 278

[56] References Cited

U.S. PATENT DOCUMENTS

| | | | |
|---|---|---|---|
| 3,698,332 | 10/1972 | McCallum | 221/211 X |
| 3,788,518 | 1/1974 | Beebe | 221/211 |
| 3,789,575 | 2/1974 | Bross | 221/211 X |
| 3,891,120 | 6/1975 | Loesch et al. | 221/278 X |
| 3,954,204 | 5/1976 | Becker | 221/211 |
| 4,898,108 | 2/1990 | McDermott | 221/211 X |

*Primary Examiner*—Terry Lee Melius
*Assistant Examiner*—Robert Pezzuto
*Attorney, Agent, or Firm*—Dean Edmundson

[57] ABSTRACT

Apparatus for planting seeds or bulbs (e.g., potatoes, onions, flowers, etc.) using a seed metering mechanism which relies upon a vacuum to select seeds out of a hopper. The apparatus includes a plurality of arms extending radially outward from an axis, a cup secured to the outer end of each arm and a vacuum communicating with each cup such that a seed contacted by the cup in the hopper is retained in the cup by atmospheric pressure. When the arms are rotated, the cups pass through the hopper so that each cup can contact the seeds and retain one seed in the cup. At a designated point outside the hopper the seed is released so that it can pass through a spout or chute and into a furrow in the soil.

9 Claims, 8 Drawing Sheets

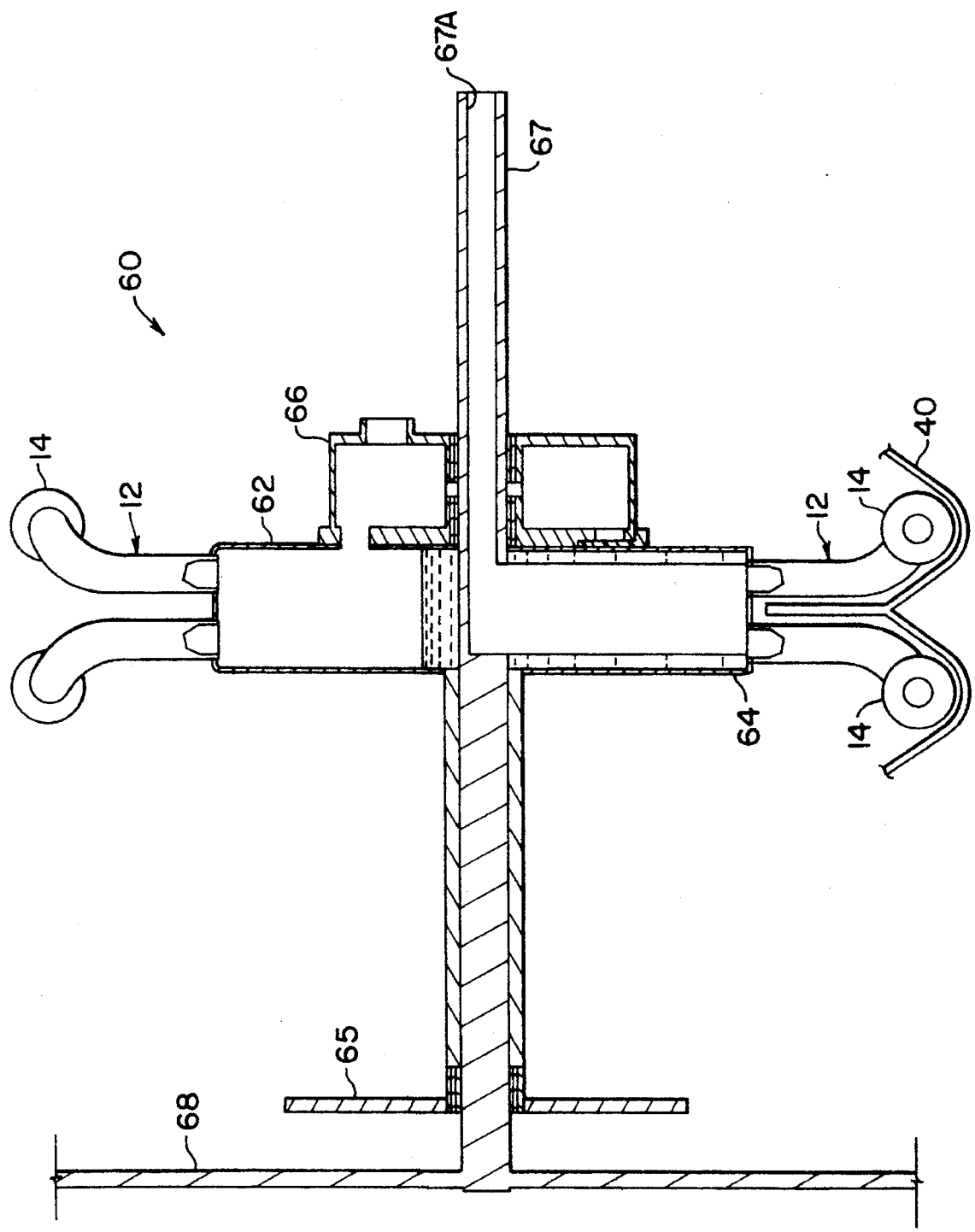

FIG. 9A
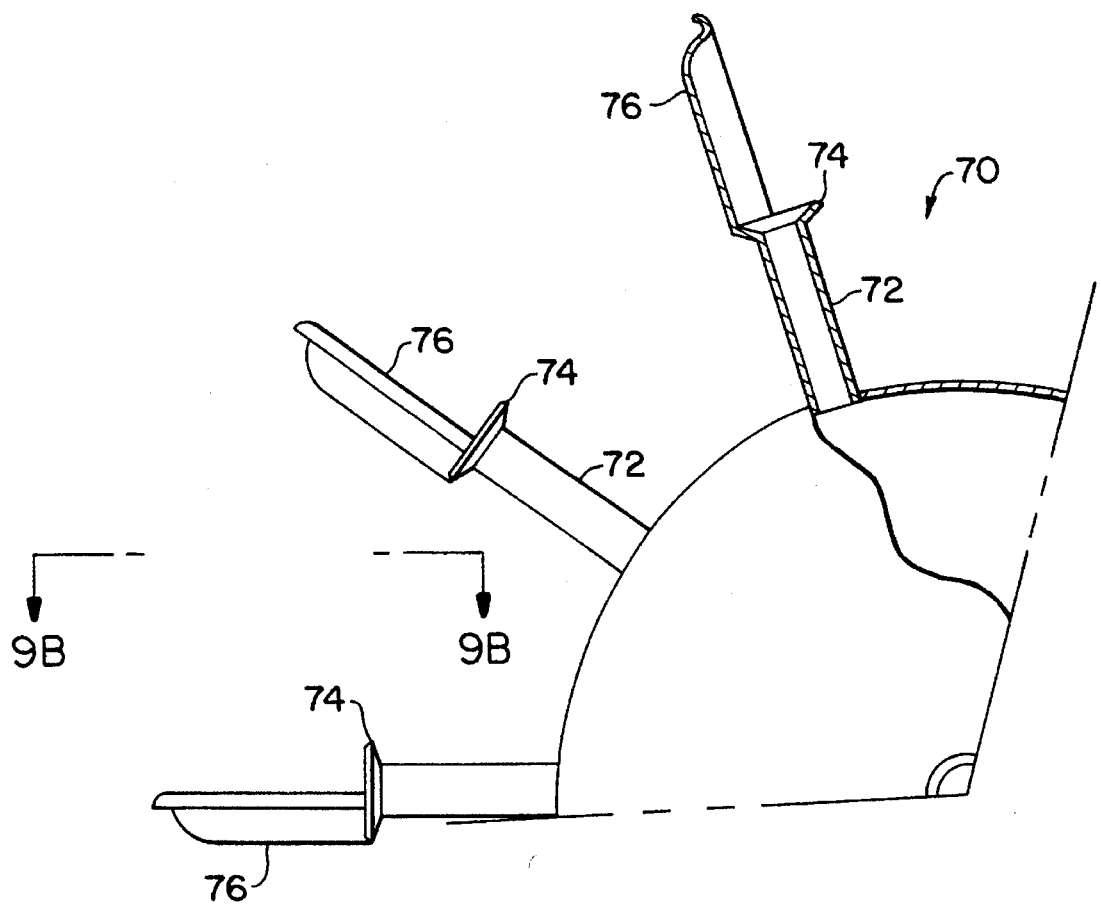
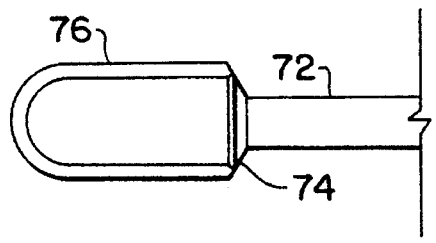
FIG. 9B

VACUUM PLANTING APPARATUS

FIELD OF THE INVENTION

This invention relates to planting apparatus. More particularly, this invention relates to apparatus useful for planting seeds such as potato seeds. Even more particularly, this invention relates to planting apparatus which utilizes a vacuum for metering the seeds.

BACKGROUND OF THE INVENTION

Mechanical planters for planting a variety of seeds in furrows in the soil have been known for decades. Various mechanisms have been used for separating and metering the seeds. Although this is relatively easy to do when working with seeds such as corn, beans, etc., this is a very difficult assignment when working with seeds such as potatoes.

One conventional mechanism for metering seed potatoes in mechanical planters involves the use of picks or nails to select the seed from a reservoir or hopper containing seed potatoes. The picks are carried on the ends of movable arms attached to a wheel which rotates through a seed reservoir or hopper. As the wheel rotates, the sharp pick or nail on the outer end of each arm impales or pierces a seed potato and carries it out of the reservoir to a designated point where the seed is to be dropped or released from the pick (e.g., into a seed spout). The arm carrying the pick is cam operated in a manner such that the pick is moved rearwardly relative to a plate through which the pick protrudes. When the pick is moved rearwardly, the seed is forced off from the pick by the plate. When the pick arm rotates into the reservoir again, the pick snaps back to its original position, thereby enabling the pick to impale another seed. There may be more than one pick on each arm, as desired.

The pick mechanism described above is reasonably proficient in picking single seed pieces and in being able to operate accurately at high speeds. Because the picks mechanically pierce the seeds, pick planters are more tolerant of cut seed and uneven seed size.

One disadvantage or drawback of the pick mechanism is that it will not pick rocks out of the seed reservoir. Consequently, the pick will miss a seed each time a rock is in position to be picked when the pick arm snaps forwardly in the reservoir. The rocks can also damage the picks, thereby rendering them useless.

Another disadvantage of the pick mechanism is that more than one seed potato may be impaled on a single arm, resulting in undesirable planting of two seeds in an area in which only one seed is desired.

Yet another disadvantage of the pick mechanism is that the pick has only one opportunity to impale a seed in the hopper (i.e., when the pick snaps forwardly through the plate). If the seed is not properly positioned when the pick snaps forwardly, the seed will not be impaled.

Another type of conventional planter is referred to as a cup planter. This type of planter is very simple and involves cups or scoops mounted on a chain or belt. The seed is selected by running the cup upwardly through the seed reservoir. Multiple seed pieces are typically removed from a single cup by vibrating the belt or chain carrying the cups. The cups do not generally damage the seed as much as the pick. Every function in the cup planter is limited by gravity. It is difficult to singulate the seed at high speed. This results in skips or multiple seed drops. Uneven seed size or shape, especially with cut seed, aggravates the shortcomings of the cup seed meter.

Another type of conventional planter is a grip planter in which a seed is mechanically grasped without piercing it. This type of planter does not damage the seed. However, it has the disadvantage that there is a discreet pick point. If the seed is not in the proper position relative to the grip mechanism, the seed is not grasped.

There has not heretofore been provided planting apparatus having the advantages provided by the apparatus of the present invention.

SUMMARY OF THE PRESENT INVENTION

In accordance with the present invention there is provided improved planting apparatus in which individual seeds are selected by means of vacuum. A plurality of arms extend radially outward from a central hub. The hub rotates so that the arms pass through a reservoir or hopper containing the seeds. Each arm is hollow (i.e., it includes a longitudinal cavity). A vacuum is drawn through each arm, and the outer end of each arm includes a small cup with an opening in it allowing air to be drawn through the lower portion of the cup and through the arm.

As each arm moves through the seed reservoir, a vacuum is drawn through the arm so that a seed becomes attached to the cup at the end of the arm. The vacuum is maintained as each arm continues to rotate out of the reservoir. When each arm reaches a desired point, the vacuum is eliminated so that the seed can drop downwardly into a seed spout, for example. From there the seed drops into a furrow in the soil prepared by the planting apparatus. Preferably, positive air pressure is applied to the cup after the vacuum is ceased so as to force the seed out of the cup.

The vacuum planter of this invention can be operated at high speeds with very good reliability. Another advantage is that the cups do not damage the seeds.

Yet another significant advantage of the apparatus of this invention is that there is a very large angular window (over 90 degrees) in which a seed can become captured in a cup by the vacuum. In other words, as each arm moves through the hopper or reservoir the vacuum (i.e., negative pressure) is applied. Thus, a seed may be captured or retained on the cup at any point where the arm and cup are in the hopper. This assures that a seed will be captured each time the cup passes through the seed hopper.

Furthermore, because the vacuum is active, a seed which is near the cup will be drawn to the cup. It is not necessary for a seed to be in proper alignment with respect to a cup in order to become captured.

Another advantage of the planting apparatus of this invention is that there are very few moving parts. As a result, the apparatus can operate for lengthy periods of time without requiring repairs or servicing.

Other advantages of the planting apparatus of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which:

FIG. 8B is a cross-sectional view of the apparatus shown in FIG. 8A taken along line 8B—8B;

FIG. 9A is a side elevational view illustrating another picker wheel useful in this invention; and FIG. 9B is a top view of one of the arms of the wheel shown in FIG. 9A.

DETAILED DESCRIPTION OF THE INVENTION

The apparatus of this invention is very useful for metering seeds in planting apparatus. The meter apparatus includes a plurality of radially-extending arm members which each include a cup member on the outer end. A vacuum is drawn through a cavity in each arm member. By reason of a small opening in each cup which opens to the cavity in the arm member to which it is attached, a seed placed in or near the cup will become attached to the cup.

The arm members are rotated about an axis (preferably a horizontal axis) in a manner such that the arm members pass vertically through a hopper or reservoir of seeds in the planting apparatus. Each cup member is thus caused to move upwardly through the seed hopper, whereby each cup member picks and retains a single seed therein by reason of the applied vacuum.

When each arm member passes out of the hopper, the seed in the cup on the end of that arm member is retained by the vacuum until the arm member reaches a designated point where the vacuum is discontinued. Preferably a short burst of positive air pressure is applied to the cavity in the arm member and thence to the cup member. This short burst of positive air pressure assures that the seed, or any foreign material caught in the opening, will be forced out of the cup.

The types of seeds which may be selected and planted using the apparatus of this invention may vary. For example, the seeds which may be planted with the apparatus of this invention include seed potatoes, bulbs, onions, etc.

Figure 1:
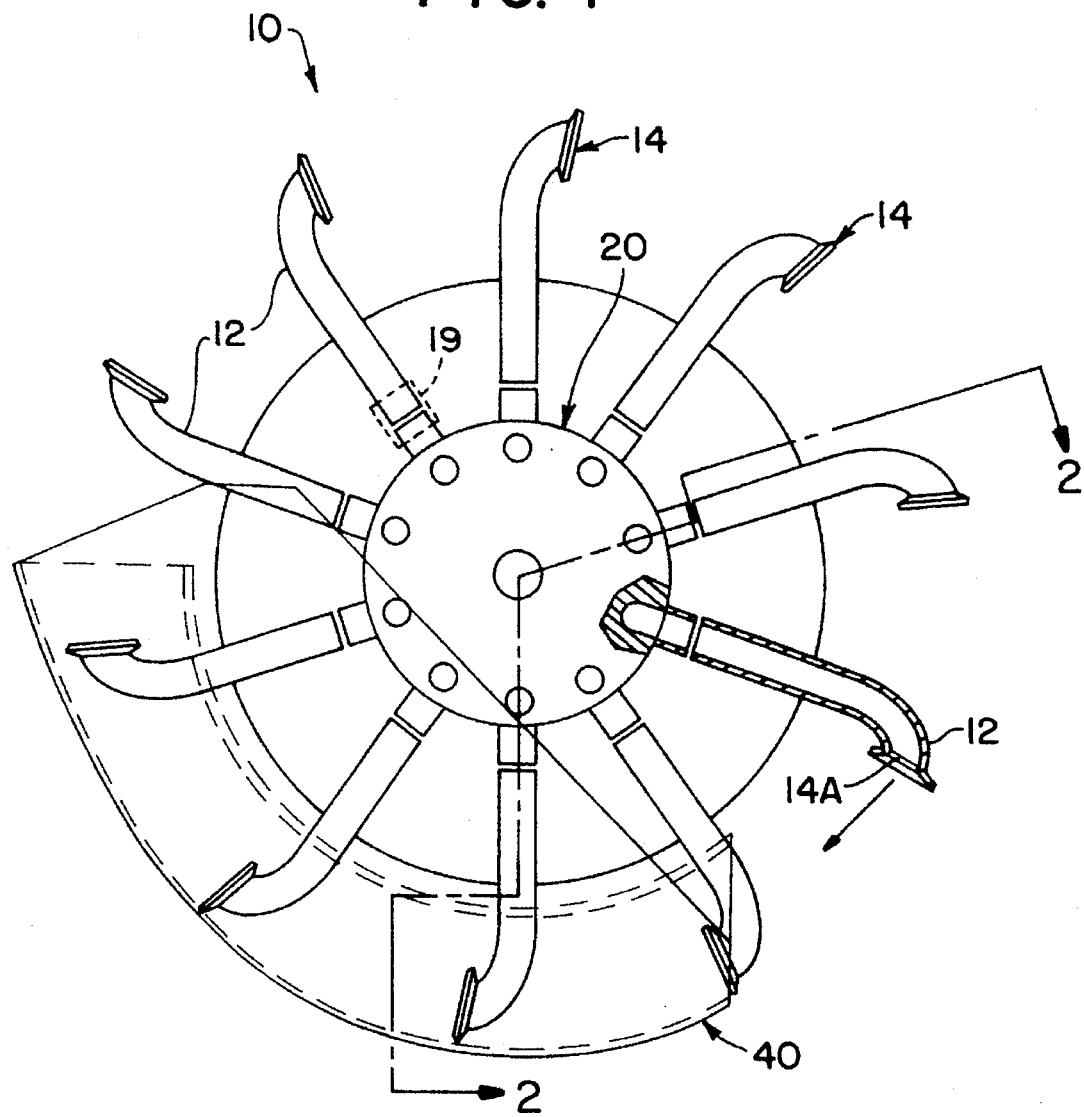
FIG. 1 is a side elevational view showing one embodiment of a picker wheel used in seed metering means of the invention.

In FIG. 1 there is shown a side elevational view of one embodiment of picker wheel 10 which is useful herein. The wheel comprises a plurality of elongated arm members 12 which extend radially outward from a central axis. Preferably the arm members are of the same length and are equidistantly spaced from each other, as shown.

At the outer end of each arm member there is a cup 14 (which could be in the form of a flared end or it may be a shallow cup which is secured to the end of the arm member). Preferably the outer end of each arm member is curved or otherwise oriented in a forward direction (i.e., in the direction in which the picker wheel rotates). The direction of rotation is shown by the arrow. Accordingly, it is preferred for the open end of the cup to face generally in the direction of rotation of the picker wheel.

Each arm member 12 is tubular or otherwise includes a longitudinal cavity therethrough. The cup member includes an opening 14A in the base thereof which communicates with the cavity in arm member 12.

Figure 2:
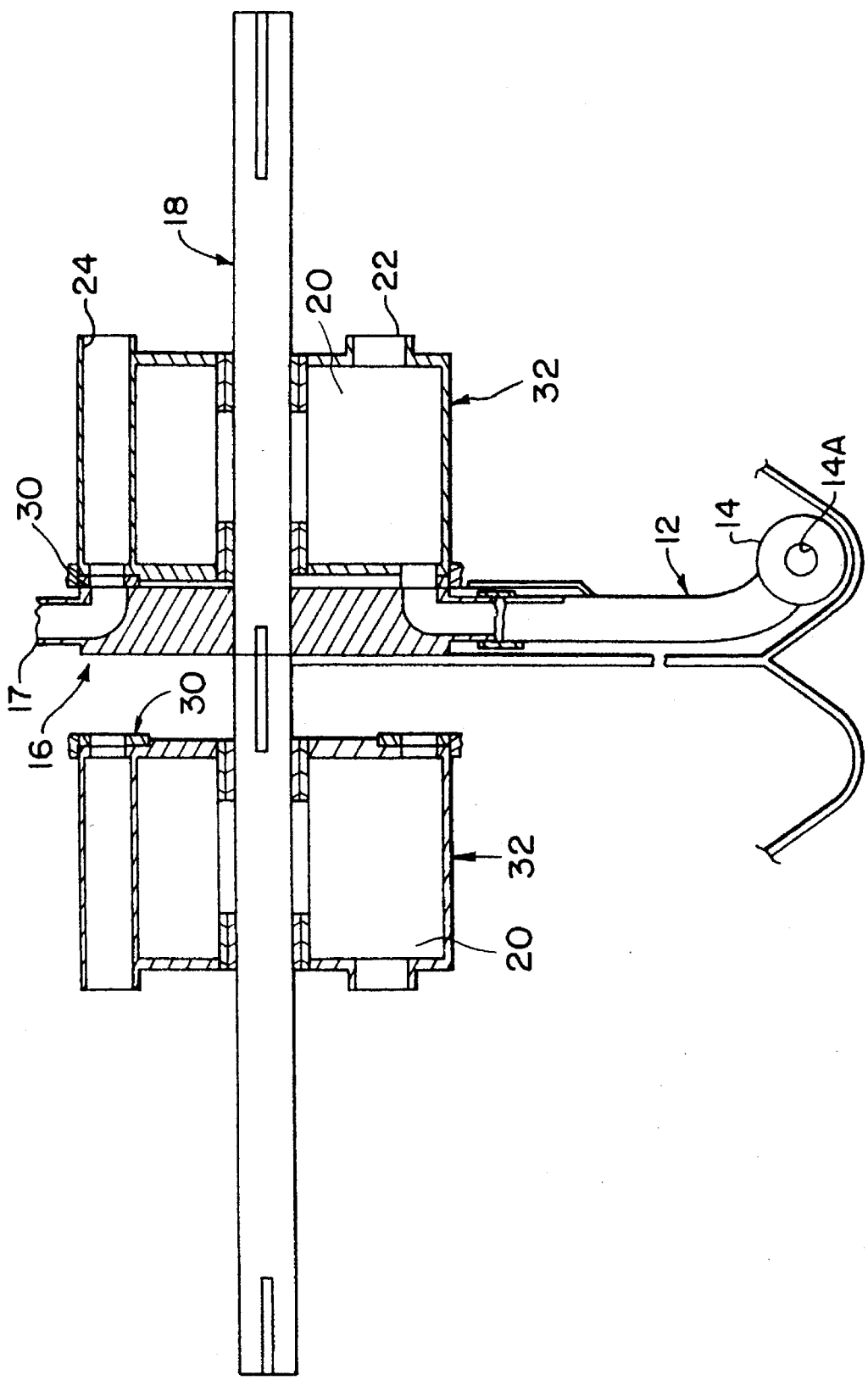
FIG. 2 is a cross-sectional view of the apparatus shown in FIG. 1.

The inner end of each arm member 12 is attached to a valve rotor 16 which rotates on axle 18 as shown in FIG. 2. The axle is driven at a desired speed which is dependent upon the ground speed of the planting apparatus and the desired plant spacing.

A non-rotating valve body 32 including an evacuation chamber 20 surrounds the axle. An opening 22 in chamber 20 is connected to a vacuum pump.

Figure 4:
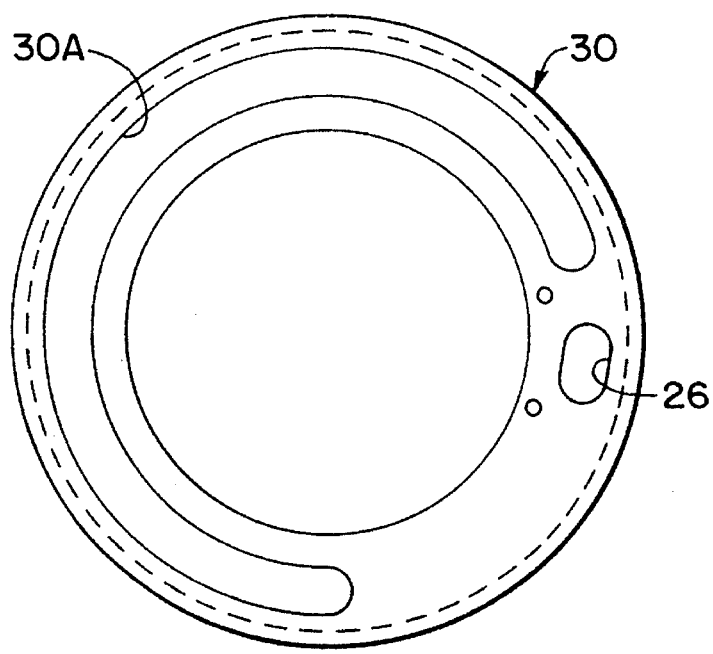
FIG. 4 is a side elevational view of one embodiment of valve seal useful in the apparatus of this invention.
Figure 5:
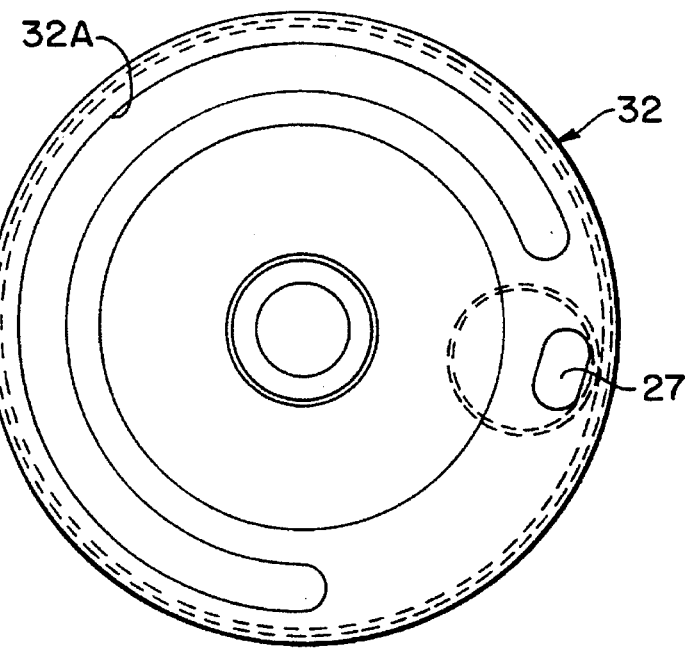
FIG. 5 is a side elevational view of one embodiment of valve body which is useful in combination with the valve seal of FIG. 4 in this invention.

Between valve body 32 and valve rotor 16 there is a valve seal. The valve seal 30 is shown in elevation in FIG. 4, and the valve body 32 is shown in elevation in FIG. 5. The seal 30 includes an elongated curved slot or opening 30A, and valve body 32 includes a corresponding opening 32A.

Figure 6:
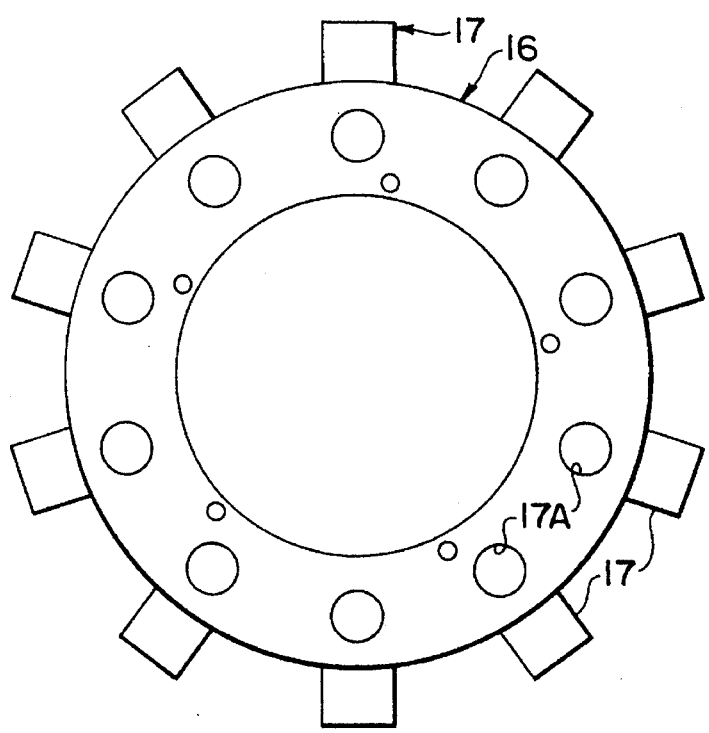
FIG. 6 is a side elevational view of a valve rotor which is useful in the apparatus in conjunction with the valve body of FIG. 5.
Figure 7:
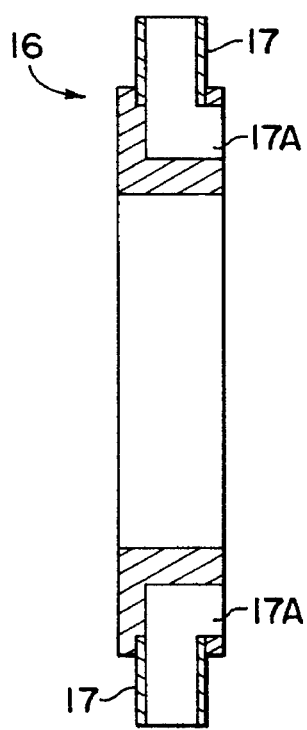
FIG. 7 is a cross-sectional view of the valve rotor shown in FIG. 6.

The valve rotor 16 is secured to the axle 18 and is driven rotationally by axle 18. The valve rotor is shown in side elevation in FIG. 6 and in cross-section in FIG. 7. The valve rotor includes a plurality of arms 17 which extend radially outwardly. The inner end of each arm 17 includes an opening 17A which is accessible on one side surface of the valve rotor, as shown in the drawings.

As valve rotor 16 is rotated, several of the openings 17A communicate with the vacuum in the evacuated chamber 20 through openings 30A and 32A in the valve seal and valve body, respectively, which are stationary. Thus, as the valve rotor is rotated, a vacuum is drawn through each arm 17 which communicates with chamber 20 through the valve seal and valve body.

Each arm member 12 is attached to the outer end of an arm 17 by means of a hose or conduit 19. One such conduit is shown in dotted line in FIG. 1. Alternatively, arms 17 and arms 12 may be integral with each other.

Valve seal 30 and valve body 32 also preferably include another opening 26 and 27, respectively. Such openings are aligned with chamber 24 which is connected to a source of positive air pressure. Thus, when an opening 17a communicates with openings 26 and 27, positive air pressure is supplied through a corresponding arm member 17 and arm member 12 to cup member 14. This positive pressure forces a seed in cup 14 to be released from the cup. Also, any debris lodged in the cup will be expelled at this time.

As the picker wheel is rotated, each arm 12 passes through a hopper 40. Because each arm communicates with the evacuated chamber 20 during a major portion of each revolution of the wheel, a seed is drawn into and retained in a cup on the outer end of arm 12 by means of vacuum. The vacuum holds the seed in the cup until the arm reaches a designated point out of the hopper, where the seed drops out of the cup (or is forced out of the cup by positive air pressure) and falls into a seed spout, for example, which directs the seed into a furrow in the soil.

Preferably there are two rows of picker arm assemblies positioned on the same wheel in back-to-back relationship.

In other words, two picker wheels (one a mirror image of the other) can be operated adjacent to each other on a single axle. The two sets of arms are angularly spaced so that seeds will be dropped equally spaced and alternately from each side.

Figure 3:
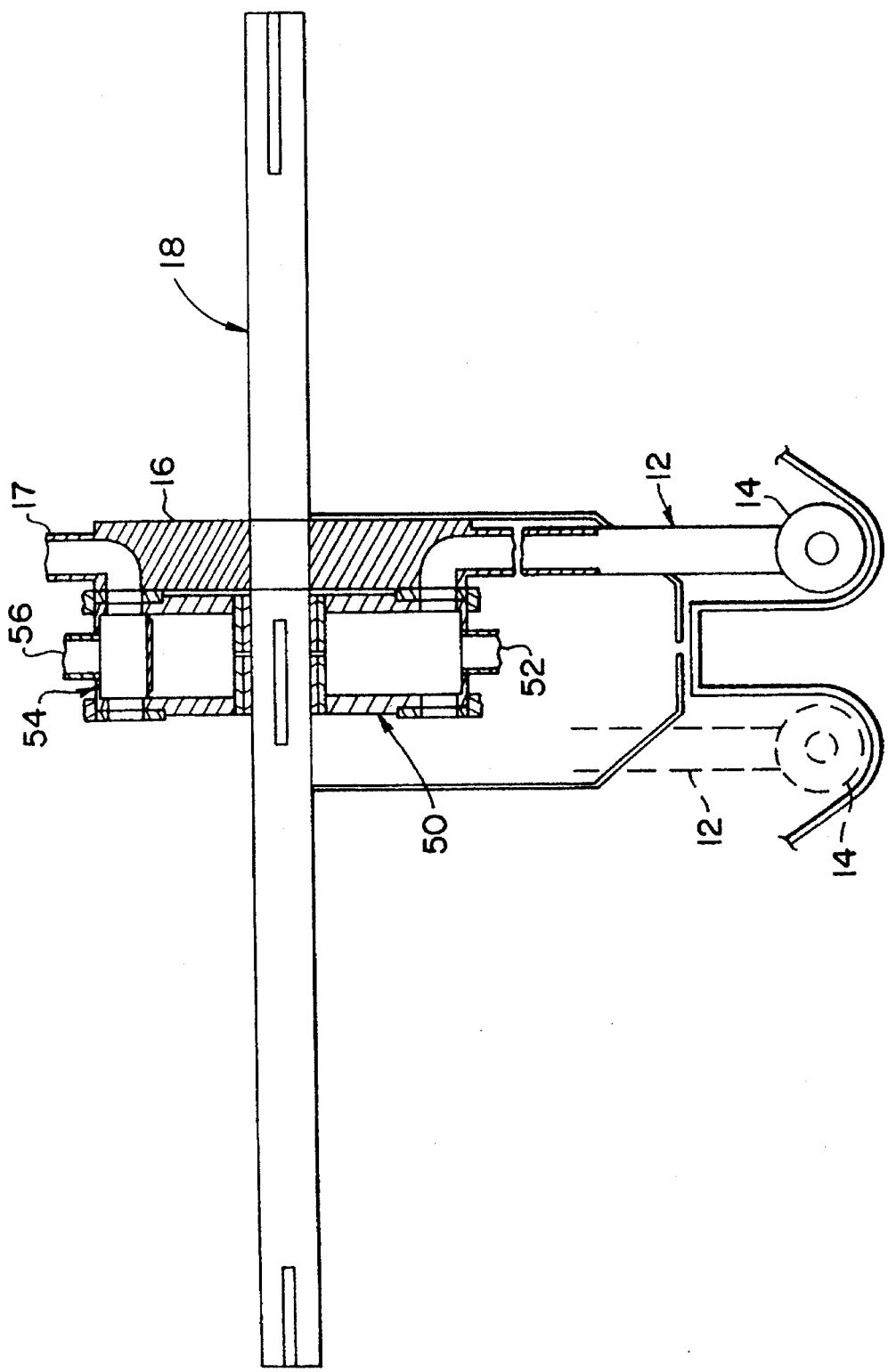
FIG. 3 is a cross-sectional view of another embodiment of a picker wheel which is useful in seed metering apparatus of the invention.

FIG. 3 is an elevational view of another embodiment of picker wheel of the invention in which the vacuum chamber 50 includes an opening 52 in its radially-outer surface which connects to a vacuum pump. Pressure chamber 54 includes an opening 56 in its radially-outer surface which connects to a source of positive air pressure.

Figure 8A:
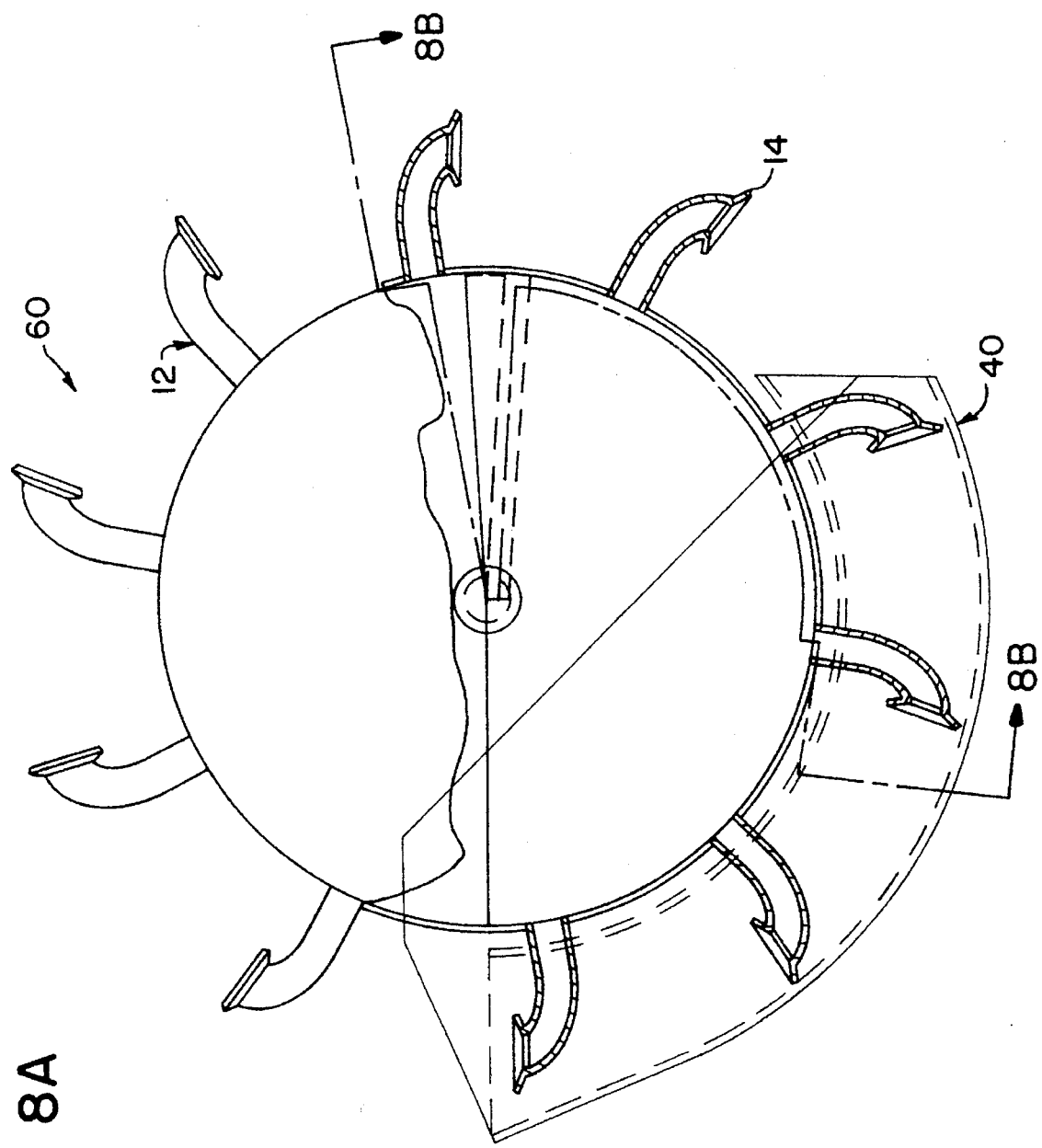
FIG. 8A is a side elevational view of another embodiment of picker wheel means which may be used in the apparatus of this invention.

FIGS. 8A and 8B illustrate another embodiment of picker wheel 60 of the invention utilizing another method for controlling the vacuum to the picker arms 12. The interior of the picker wheel hub 62 is evacuated. The vacuum is valved with a non-rotating shoe 64 in close radial proximity to the innermost end of the picker arm 12. The vacuum source is applied through a ported body 66 with a seal between it and the wheel hub. The parts are so arranged that the combination of rotating parts can be driven by a chain or other means connected to gear 65. The shoe is fixed to a non-rotating shaft 67 secured to the frame 68, for example.

Although the shoe does not rotate during operation of the apparatus, it may be rotated slightly for the purpose of setting the seed pick-up and release timing.

Means for applying positive air pressure may be provided through the opening 67A in fixed shaft 67.

FIGS. 9A and 9B illustrate another version of picker wheel assembly 70 having a plurality of spaced arm members 62 with a cup 74 on the outer end of each arm. A scoop 76 is secured to the cup at an angle (preferably perpendicular or at an even greater angle). The cup includes an opening in its base which communicates with the vacuum source in the same manner as described above with respect to the other embodiments.

As the scoop passes through the seed hopper it scoops up one or more seeds. As the wheel rotates upward, the seeds will fall downward toward the cup and vacuum port. One seed will become attached to the cup while the other seeds will fall back into the hopper.

The scoop is essentially concave so that seed will not fall off before the wheel carries the seed high enough to come in contact with the evacuated port in the cup. When the scoop is used, the vacuum may be applied over a smaller angle of rotation of the wheel, thus reducing the required size of the vacuum pump.

Other variants are possible without departing from the scope of this invention. For example, the cup members may be lined with a soft, deformable cushion material in order to facilitate better sealing between the seed and the cup when vacuum is applied. It is also possible to connect a shaker to the picker wheel to assure that no extra seeds are carried out of the hopper by the cup members.

The hopper is shown herein as being curved in cross-section so as to generally correspond with the path of the cup members as the picker wheel rotates through the hopper. Other shapes for the hopper may also be used. Preferably the shape of the hopper is such that each arm passes through an arc of at least 90° while still in the hopper.

It is also preferable to include a spring axially of the vacuum chamber to urge the chamber, the valve body and valve seal toward or against the valve rotor when no vacuum is present in the vacuum chamber. This assures that a proper seal is present when the vacuum is again applied.

The picker wheel assembly of this invention may be made in any desired size and may be rotated at any suitable speed.

The inside surface of the cavity in each arm member 12 is preferably smooth and is composed of a corrosion-resistant material (e.g., plastic, aluminum, galvanized metal). This smooth surface prevents build-up of dirt. The cavities can also be periodically cleaned with water, for example.

What is claimed is:

1. In seed planting apparatus of a type having a frame, a hopper supported by the frame for carrying a supply of seeds to be planted, and furrow forming means for forming a furrow in soil to receive said seeds in a longitudinally-spaced manner, wherein an improvement comprises seed metering means comprising:
   (a) a plurality of elongated arm members extending radially outward from an axis; wherein each said arm member includes inner and outer ends; wherein each said arm member includes an internal cavity;
   (b) a cup member secured to said outer end of each said arm member; wherein said cup member includes an opening communicating with said cavity in said arm member;
   (c) rotating means for rotating said arm members relative to said axis; wherein said arm members pass through said hopper; and
   (d) vacuum means communicating with said cavity in each said arm member in a manner such that a seed contacted by the cup member on said arm member is retained in said cup by atmospheric pressure;
wherein as each said arm member passes through said hopper a seed becomes attached to and retained in the cup on said arm member; and wherein said seed is released from said cup at a designated point out of said hopper.

2. The apparatus in accordance with claim 1, wherein each said cup member includes a concave surface which is faced generally in the direction of travel of said cup member.

3. The apparatus in accordance with claim 1, wherein said axis is in a generally-horizontal plane.

4. The apparatus in accordance with claim 1, wherein said apparatus further includes a source of positive air pressure for forcing said seed out of said cup member at said designated point.

5. The apparatus in accordance with claim 1, wherein said internal cavity in each said arm member includes a smooth surface.

6. The apparatus in accordance with claim 1, wherein said arm members are connected to a rotatable hub member.

7. The apparatus in accordance with claim 6, wherein said vacuum means comprises an evacuated chamber body, a valve seal and a valve body; wherein said valve seal and said valve body are disposed between said chamber body and said hub member.

8. The apparatus in accordance with claim 1, wherein each said arm member travels through an arc of at least 900 while in said hopper.

9. A method for metering seeds in planting apparatus of a type including a hopper for carrying a supply of seeds to be planted, the method comprising the steps of:
   (a) providing seed metering means comprising:
      (i) a plurality of elongated arm members extending radially outward from an axis; wherein each said arm member includes inner and outer ends; wherein each said arm member includes an internal cavity;
      (ii) a cup member secured to said outer end of each said arm member; wherein said cup member includes an opening communicating with said cavity in said arm member;

(iii) rotating means for rotating said arm members relative to said axis; wherein said arm members pass through said hopper; and
(iv) vacuum means communicating with said cavity in each said arm member in a manner such that a seed contacted by the cup member on said arm member is retained in said cup by atmospheric pressure;

(b) rotating said arm members through said hopper;

(c) applying vacuum to the cavity in each said arm member in a manner such that a seed contacted by said cup member in said hopper is retained in said cup member;

(d) removing the vacuum from said cavity when each said arm member reaches a designated point outside of said hopper.

* * * * *